United States Patent
Filipi-Martin et al.

(10) Patent No.: US 7,123,722 B2
(45) Date of Patent: Oct. 17, 2006

(54) ENCRYPTION MANAGEMENT SYSTEM AND METHOD

(75) Inventors: Adrian Filipi-Martin, Charlottesville, VA (US); Brian Hope, Charlottesville, VA (US)

(73) Assignee: GlobalCerts, LC, Richmond, VA (US)

( * ) Notice: Subject to any disclaimer, the term of this patent is extended or adjusted under 35 U.S.C. 154(b) by 810 days.

(21) Appl. No.: 10/023,569

(22) Filed: Dec. 18, 2001

(65) Prior Publication Data

US 2002/0076055 A1 Jun. 20, 2002

Related U.S. Application Data

(60) Provisional application No. 60/256,507, filed on Dec. 18, 2000.

(51) Int. Cl.
*H04L 9/00* (2006.01)

(52) U.S. Cl. .................... 380/279; 380/282; 380/278

(58) Field of Classification Search ............. 380/278, 380/282, 285, 279; 713/170, 156
See application file for complete search history.

(56) References Cited

U.S. PATENT DOCUMENTS 5,922,074 A * 7/1999 Richard et al. ............. 713/200
6,487,599 B1 11/2002 Smith et al.
6,684,331 B1 * 1/2004 Srivastava .................. 713/163

OTHER PUBLICATIONS

Donnelly, "Designing an LDAP Directory," May 2000, available at http://ldapman.org/articles/tree_design.html.*
Knight et al., "Cashing in on Caching," 1996, available at http://www.ariadne.ac.uk/issue4/caching.*
A protocol for establishing secure communication channels in a large network Harn, L.; Huang, D.; Knowledge and Data Engineering, IEEE Transactions on vol. 6, Issue 1, Feb. 1994 pp. 188-191.*
Locality driven key management architecture for mobile ad-hoc networks Gang Xu; Iftode, L.; Mobile Ad-hoc and Sensor Systems, 2004 IEEE International Conference on Oct. 25-27, 2004 pp. 436-446.*
Distributed authentication in Kerberos using public key cryptography Sirbu, M.A.; Chuang, J.C.-I,; Network and Distributed System Security, 1997. Proceedings., 1997 Symposium on Feb. 10-11, 1997 pp. 134-141.*

* cited by examiner

*Primary Examiner*—David Jung
(74) *Attorney, Agent, or Firm*—Douglas W. Kim; McNair Law Firm, P.A.

(57) ABSTRACT

This invention is directed to a distributed database system for storing and publishing public and private keys of an encryption system. Through the use of a distributed database network, keys can be stored, associated with member's accounts, published, retrieved and utilized automatically without the necessity of the individual member managing the public or private keys. The distributed eliminates the necessity of the public or private keys from being located at a single location allowed the flexibility for a multitude of user to manage public and private keys.

21 Claims, 4 Drawing Sheets

ENCRYPTION MANAGEMENT SYSTEM AND METHOD

This application claims priority on Provisional Patent Application No. 60/256,507 filed on Dec. 18, 2000 entitled Automated Distributed Encryption Management System and Method.

FIELD OF THE INVENTION

This invention is directed to an encryption management system and method and, particularly, to the automated management of encryption keys including the storage and publication of encryption keys over a distributed network.

BACKGROUND OF THE INVENTION

In the field of electronic messaging, digital certificates, document authentication and document transfer, security is of the utmost importance. As electronic commerce and online communications continue to increase at a staggering pace, the need for secured communication is critical. One such method of providing this security is through the use of a public key infrastructure. Secure communications through the use of public and private keys facilitates encrypted electronic messaging, document signature, signature verification, message authentication and other such secured transactions. Companies are forecasting that 20% of their resources will be directed to providing online content by the year 2003. As such, unauthorized access to computer information is a top concern. Providing for secured controlled access in an efficient and automated manner is a problem to which significant attention need be directed. The use of public and private key pairs is instrumental in providing this security since it applies to encrypted e-mail, signature verification, document authentication and message authentication. Traditional electronic encryption seeks to provide for public and private keys but relies upon centralized or private networks for creating, maintaining and managing key pairs. These systems typically make use of the Lightweight Directory Access Protocol (LDAP) for the use of managing pubic keys and, as a result, have not been widely adopted. The reliance upon centralized databases and LDAP requires traditional encryption systems to be organized in geographical, political or other organizational boundaries without regard to transmission efficiencies or load balancing across a distributed network. Such systems are limited in their reliance on a centralized database which degrades performance exponentially with the number of user and keys. Additionally, such systems are not optimized for physical network architecture, bandwidth, return traffic, or other such physical characteristics of communications. These systems also require heavy investments in time and expense based upon the significant amount of management and maintenance. According to cyberatlas, an Internet statistics source, 135.7 million Internet users reside in the United States, 375 million users are worldwide, and collectively 1 billion hours are spent online per week. Obviously, a centralized public key database simply cannot accommodate this fantastic volume.

Therefore, there is a tremendous need for an easily managed, automated, high performance public key infrastructure (PKI) that is widely available, distributable, and scalable allowing the system to maintain a superior level of responsiveness regardless of the number of users or load on the system.

In understanding this invention, the following terms are helpful in this art.

Public Key—one key of a key pair that is used to encrypt a message or document and mathematically linked to a private key.

Private Key—one key of a key pair that is used to decrypt a message or document encrypted with a public key and mathematically linked to the public key.

Public Key Infrastructure (PKI)—a system for providing public and private key pairs as well as, publishing public keys.

Hash value—the results of a mathematical manipulation of information producing a unique digital fingerprint of a larger document.

Spoofing—deceiving a server that communication from another source is authorized when, in fact, it is not—a form of computer hacking.

Validation—the process of determining whether a public key is still valid.

Authentication—the process of using a public key to determine that a message was actually sent from the named sender.

Public Key publication—the process of making public keys available to applications to be used for encryption.

Transmission Control Protocol (TCP)—a protocol for getting data from one network device to another. Typically, retransmission strategies are employed to ensure data will not be lost.

In using public key encryption, the sender of a message must have the certified and validated public key of a recipient prior to encrypting a message to be sent to the recipient. Therefore, the sender must have a process or method of learning the recipient's public keys. Also, a recipient wishing to authenticate a message must have access to the sender's public key. Additionally, an entity wishing to view messages encrypted with its public key, must have published its public key and maintain the associated private key used in decryption. However, in the best case of traditional PKI systems, a centralized storage of public keys is used and in some of the worst cases, the recipient must have individually transmitted the public key to all the senders from which the recipient wishes to receive encrypted mail.

Accordingly, it is a benefit of this invention to provide for a distributed database of keys for decentralizing key lookup, improving lookup performance and increasing fault tolerance through distributed key storage.

It is also a benefit of this invention to assist in providing an automated messaging encryption system for encrypting and decrypting messages and documents without significant maintenance or user interactivity.

SUMMARY OF THE INVENTION

The above objectives are accomplished according to the present invention by providing a computerized system for storing and publishing encryption keys for an electronic encryption system that sends encrypted transmissions between a sender and a recipient comprising a first computer readable medium having a first communications connection for electronic communications over a network; a first database having a first set of public keys embodied in the first computer readable medium; a second computer readable medium having a second communications connection for electronic communications over a network for providing electronic communications with the first computer readable medium; a second database having a second set of public keys embodied in the second computer readable medium; a first set of computer readable instructions embodied within the first computer readable medium for: receiving a request for a recipient's public key from the sender through the first communications connection; querying the first database for the requested recipient's public key; transmitting the recipient's public key to the sender if the recipient's public key is found in the first database, and, transmitting a second request for the recipient's public key to the second computer readable medium if the recipient's public key is not found in the first database so that the sender is either provided with the recipient's public key or the second request is sent to the second computer readable medium requesting the recipient's public key. The system can also allow for the second communications connection to provide electronic communications with a root server. A second set of computer readable instructions embodied within the second computer readable medium has instructions for: receiving a second request for the recipient's public key from the first set of computer readable instructions; querying the second database for the recipient's public key, transmitting the recipient's public key to the first computer readable medium if the recipient's public key is found in the second database, and, transmitting an upstream request for the recipient's public key to the root server if the recipient's public key is not found in the second database so that the recipient's public key is provided to the first computer readable medium or the upstream request is sent to the root server for requesting the recipient's public key.

A root computer readable medium having a root communications connection for communicating with the network and the second computer readable medium can also be provided. A root database containing pointers to all public keys of the encryption system can be embodied in the root computer readable medium with a set of computer readable root instructions embodied in the root computer readable medium for: receiving the upstream request from the second set of computer readable instructions, querying the root database for the recipient's public key, transmitting the recipient's public key to the second computer readable medium if the recipient's public key is found within the root database, transmitting a pointer to the recipient's public key if the pointer to the recipient's public key is found in the root database, and transmitting a not found statement if neither the recipient's public key or pointer to the recipient's public key is found on the root database, so that the sender can be provided with the recipient's public key, the sender can be given the points to the recipient's public key or the sender can be informed that the recipient's public key can not be found.

A root server cluster can be included having at least one root computer readable medium and a root communications connection for communicating with the network and the second computer readable medium; a root database embodied within the root server cluster containing pointers to all of the public keys of the encryption system; a set of computer readable medium root instructions embodied in the root server cluster for: receiving the upstream request from the second set of computer readable instructions, querying the root database for the requested recipient's public key, transmitting the recipient's public key to the second computer readable medium if the recipient's public key is found within the root database, transmitting the pointer to the recipient's public key if found within the root database, and, transmitting a not found statement to the second computer readable medium if the recipient's public key or pointer is not found in the root database so that the sender can be provided with the recipient's public key or the sender can be informed that the recipient's public key can not be found.

The first set of computer readable instructions can include instruction for: receiving a not found statement sent from the second computer readable medium if the recipient's public key is not found within the second computer readable medium, and, transmitting an upstream request for the recipient's public key to the root server upon receiving the not found statement from second computer readable medium. The first set of computer readable instructions can include instruction for: receiving the recipient's public key from the second computer readable medium if the recipient's public key is found within the second database, and, transmitting the recipient's public key to the sender if the recipient's public key is received from the second computer readable medium so that the sender may encrypt a transmission with the recipient's public key. Additionally, the first set of computer readable instructions can include instruction for storing the recipient's public key within the first computer readable medium upon receipt of the recipient's public key so that the recipient's public key is available upon subsequent requests received for the recipient's public key. The public key can be stored within a temporary storage section that can be contained within the first computer readable medium.

The first set of computer readable instructions can include instruction for deleting the received recipient's public key from the first computer readable medium upon the expiration of a predetermined period of time. Instruction for deleting the received recipient's public key from the temporary storage section according to a set of predetermined criteria can also be included within the first set of computer readable instructions.

DESCRIPTION OF A PREFERRED EMBODIMENT

The present invention now is described more fully hereinafter with reference to the accompanying drawings, in which preferred embodiments of the invention are shown.

As will be appreciated by one skilled in the art, the present invention may be embodied as a method, data processing system, or computer program. Accordingly, the present invention may take the form comprising entirely hardware entirely software or an embodiment combining software and hardware aspects. Furthermore, the present invention may take the form of a computer product on a computer-readable storage medium having computer-readable instructions embodied in the medium. Any suitable computer readable medium may be utilized including hard disks, CD-ROMs, optical storage devices, or magnetic storage devices.

The present invention is described below with reference to flowchart illustrations of methods, functions, apparatus systems and computer programs according to the invention. It will be understood that each block of the flowchart illustrations, and combinations of blocks in the flowchart illustrations, can be implemented by computer readable instructions. These computer readable instructions may be loaded onto a general purpose computer, special purpose computer, or other data processing apparatus to produce a machine, such that the instructions that execute on the computer or other data processing apparatus create means for implementing the functions specified in the flowchart block or blocks.

These computer readable instructions may also be stored in a computer-readable medium that can direct a computer or other data processing apparatus to function in a particular manner, such that the instructions stored in the computer-readable medium produce an article of manufacture including implementation of the functions specified in the flowchart block or blocks or as herein described. The computer readable instructions may also be loaded onto a computer or other data processing apparatus to cause a series of operational steps to be performed on the computer or other processing apparatus to produce a computer implemented process such that the instructions that execute on the computer or other processing apparatus provide steps for implementing the functions specified in the flowchart block or blocks or otherwise herein.

Accordingly, the blocks of the flowchart illustrations can support combinations of means for performing the specified functions, combinations of steps for performing the specified functions, program instruction means for performing the specified functions or any combination of these. It will also be understood that each block of the flowchart illustrations and other functions described herein, and combinations of the blocks in the flowchart illustrations, can be implemented by special purpose hardware and computer instructions The function or blocks of the flowchart illustrations may be presented in terms of program procedures executed on a computer of a network of computers. These procedural descriptions and representations are the means used by those skilled in the art to most effectively convey the substance of their work to others skilled in the art. A procedure as herein described is generally a self-consistent sequence of steps leading to desired results. These steps are those requiring physical manipulations of physical quantities. Usually, these quantities take the form of electrical or magnetic signals capable of being stored, transferred, combined, compared or otherwise manipulated. A pointer is meant to refer to a variable that holds the address or location of core storage. The address or location is a number or other representation assigned to a specific location of storage. Addresses can point to zones, groups, spaces, specific computers, or specific physical memory locations. An object or module is a section of computer readable code that is designed to perform a specific task or tasks. Actual computer executable code or computer readable instructions need not be contained within one file or one storage medium. It should be noted that while illustrated as single computers, key servers can be single computers, server clusters, multiple processors within a single case or multiple cases. The key servers, as described in the present invention, are not limited to merely one computer. The computer hardware capable of serving as key servers and for processing computer readable instructions is not limited to a single computer. Therefore, the term "key server" is not intended to be limited to a single computer. Also, the term "encryption server" and the term "mail server" are not intended to be limited to a single computer. The term "encryption server" and the term "mail server" can be hardware, software or a combination of hardware and software that provide the functionality described herein. The term database is used to mean a structured organization of data organized and accessible through an index such as dBase, SQL, Microsoft Access, or, to refer to a depository of data in flat file format.

While this invention can be used for digital certificates, document authentication, secured electronic transactions, or other encryption applications, electronic messaging is used to illustrate that invention. The use of electronic mail in this description allows the management and distributed storage of keys to be readily understandable to one skilled in the art.

Figure 1A:
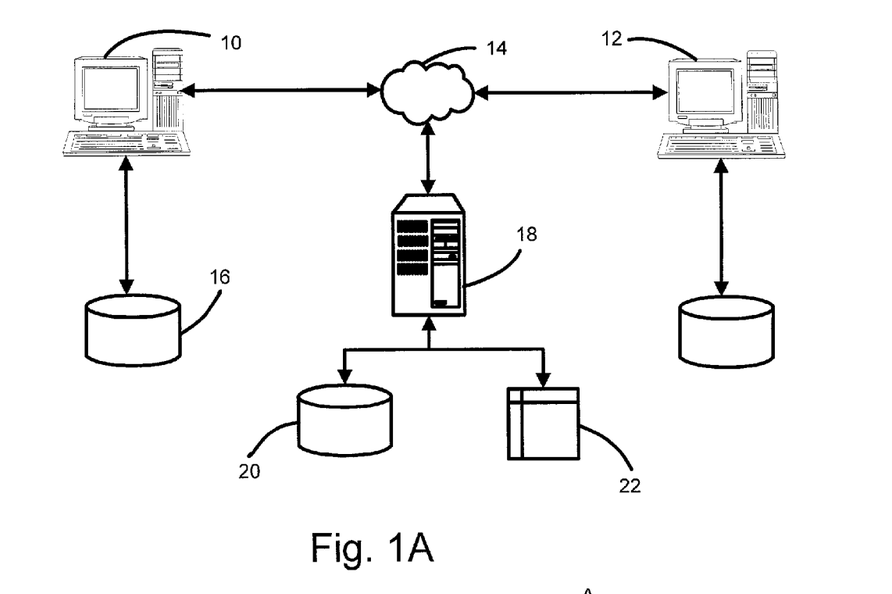
FIG. 1A is a diagram illustrating the sender's terminal, the encryption server, and the recipient's terminal.
Figure 1B:
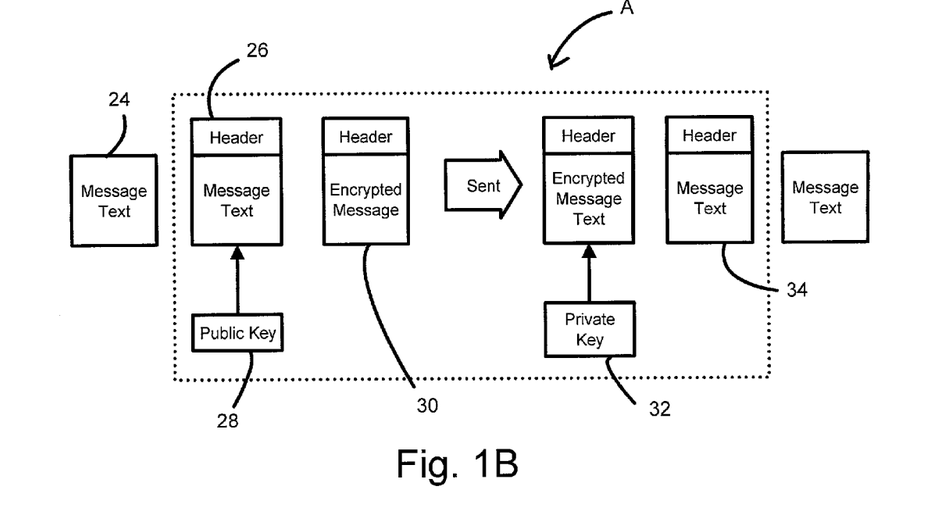
FIG. 1B is a diagram illustrating the various message flow processes for sending an encrypted message.

In further describing the present invention and referring to FIG. 1A, a client's terminal 10 is used to construct a message to be encrypted and sent to a recipient's terminal 12 through a network 14. Network 14 can be a local area network (LAN), wide area network (WAN), the Internet, or other architecture facilitating communications between computing devices or other computer readable mediums. Terminals 10 and 12 can be personal computers, personal digital assistants (PDA's), handhelds, or other such computing devices capable of sending and receiving electronic transmissions. Traditionally, the public key of the recipient is stored at the sender's terminal in a computer readable medium 16. However, the public key can also be stored on the mail server 18, encryption server or other separate computing device. In these servers, the public keys can be stored in a computer readable medium, such as a server database 20 or can be cached in memory 22. In the preferred embodiment, however, the public keys are stored on a key server cluster comprising a distributed database accessible by the mail servers of encryption servers. Computer readable instructions, on terminal 10, encryption server 18, or the mail server will when processed by a processor, provide for discovering the recipient's public key in order to encrypt the message to the recipient. The computer readable instructions of the encryption server can also intercept the message, encrypt the message sent to the recipient, encrypt the message with the recipient's public key, and send the encrypted message to the mail server for delivery Referring to FIG. 1B, the functionality of this invention is further illustrated. The sender initially drafts a message 24. The e-mail application may include header information 26 with the message. Since this message is to be encrypted, the recipient's public key 28 is needed to encrypt the message. When the public key associated with the recipient is discussed, the message is encrypted to produce an encrypted message 30. The message is then sent to the recipient. Once received, there can be computer readable instructions as a second secured encryption server in communication with the recipient's terminal to associate a recipient's private key 32 with the encrypted message, decrypting the message using the recipient's private key to provide a readable message and displaying the message for viewing by the recipient. The computer readable instructions providing this functionality and physical manipulations of information are automated so that the object, modules and functionality, illustrated generally as A, are performed without sender or recipient interaction, thus providing a simple to use, maintenance free encryption system.

Figure 2:
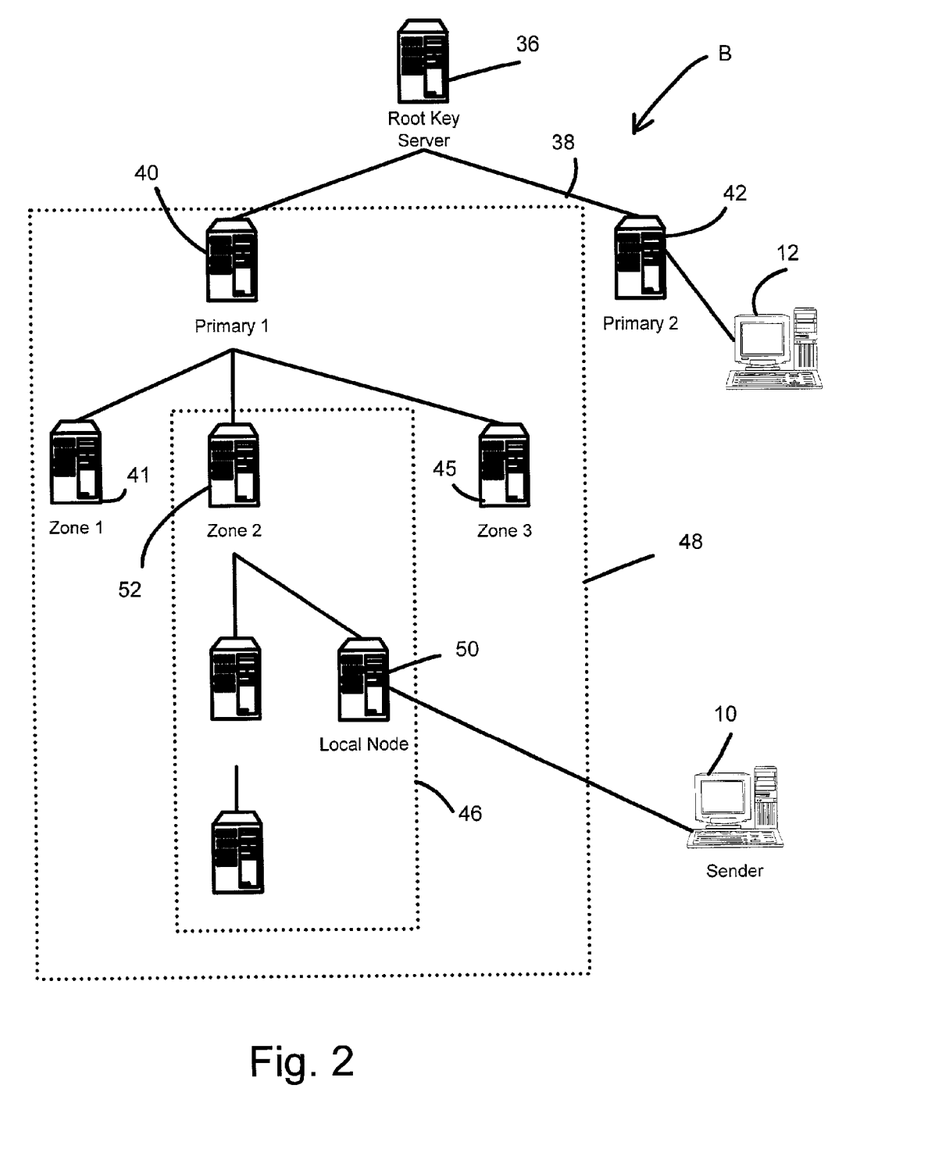
FIG. 2 is a diagram of distributed key servers.

Referring to FIG. 2, the distributed database structure is illustrated in further detail. This architecture greatly improves the performance of public key look-up as well as greatly reduces the maintenance and administrative tasks associated with the management of keys. A network, shown generally as B, provides for communications between several key servers. A root server 36 is a master or primary server containing the location of the public keys of all members of the encryption system. There can be a single root server or multiple root servers in a cluster configuration. Through a network connection 38, secondary servers 40 and 42 are in communication with both the root server as well as themselves. These secondary servers are slaves to the root key server but act as masters to the servers downstream in their hierarchy. The organization of servers is by zones, which have a master and slaves. Master servers of a zone receive their zone information from local files while secondary or slave key servers receive their zone information from the master key servers. It should be noted that it is possible for a secondary key server to receive information from other key servers approved to provide information to the secondary server. For example, key servers 41, 52, and 45 head zones 1 through 3 respectively and are secondary key servers to server 40 as well. Server 52 is a master server for the second zone 46. Additionally, key servers can also be organized into key spaces designated 48. Key spaces are logical organizations of zones.

Key servers secondary to the root server contain pointers to the keys and other information for each member but may not contain this information for all members. Such information can include the member's e-mail address, public key, and other administrative or identification information. Secondary servers communicate upstream to retrieve member's information When receiving a request for a specific public key, a key server first examines its local files, cache, or database for this information. If the public key is not found locally, a request is sent upstream in hopes of finding the public key. For example, if local node 50 is queried by sender's terminal 10 for a public key of a recipient, the local node checks a local database to find the public key. However, in this example, the recipient's public key is stored at key server 42 rather than local node 50. Therefore, key server 50 queries key server 52, its upstream server for the public key. Key server 52 informs key server 50 that server 52 does not have the public key. Having not satisfied the request, server 50 next queries root server 36. Root server 36 then informs server 50 that the requested public key resides upon key server 42. Root server 36 has this information both by its role as a root server and by its role as a master to key server 42. Since key server 42 has the information locally, key server 50 is informed that the public key exists at key server 42, key server 50 then queries key server 42 and the request for the recipient's public key is satisfied. It should be noted that at this point, key server 50 has cached the information and the public key information is available directly from local node 50 in subsequent requests. However, this cached information can be flushed at regular intervals removing this information from this server. The cache or temporary storage section of the computer readable medium can be flushed after a predetermined period of time, when the cache is full, when another public key is requested, during routine server maintenance or for a host of other reasons. While this embodiment illustrates a single server, multiple servers can be connected to a network as well as redundant servers for each node.

Figure 4:
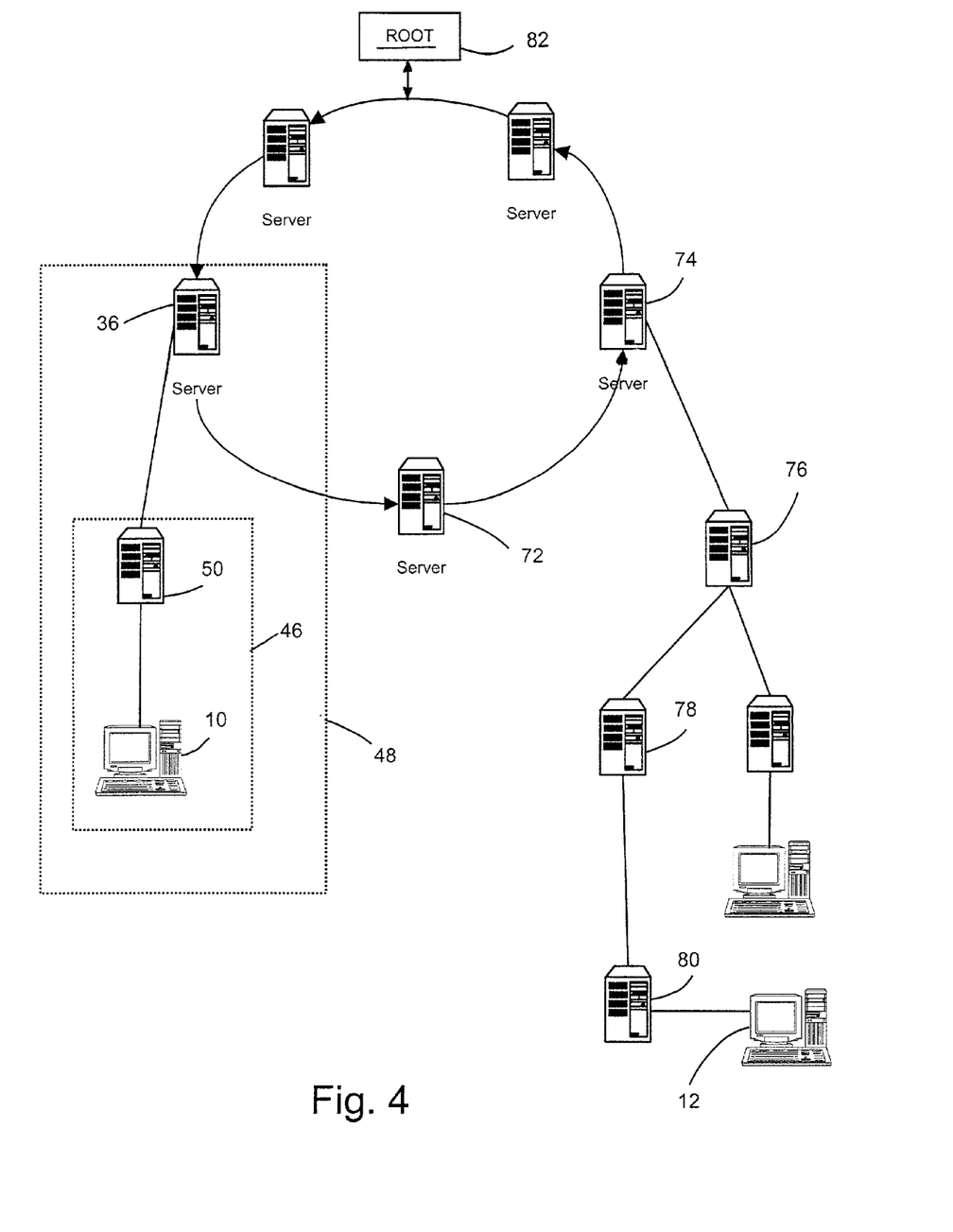
FIG. 4 is a diagram of distribution key servers with multiple roots.

FIG. 4 shows multiple root servers interconnected to form a root server cluster. Each of the root servers for the server cluster can be authoritative servers for zone 46. Therefore, secondary server 50 can query each of the root servers since each is aware of the location of each public key for members of the encryption system. When the sender wishes to send a message from terminal 10, the public key for the recipient is requested from local node 50. In this illustration, the public key for the recipient is stored on server 80 and, therefore, will not be found in zone 46 or in zone 48. Therefore, key server 36 may not have knowledge of the requested public key. At this point, zone 48 has been exhausted and the inquiry has reached the top of this tree, which terminates with root server 36. Since we have reached the root level and no public key was found, the request for the public key is passed to the root server 74. In this embodiment, key server 72 can be a redundant server to key server 36 and would contain the same information as key server 36. Such a configuration allows for increased fault tolerance and increased performance by spanning multiple servers. Once server 74 is queried, root server 74 tells key server 50 that the requested information, or a pointer to the information, is available at server 76. Server 50 then queries server 76 for the requested information. When server 76 is queried, the server tells key server 50 that its requested information or a pointer to the information, is available at server 78. When server 78 is queried, this server informs key server 50 that its requested information is on key server 80. Since the recipient is associated with server 80, the recipient's information is stored at server 80. Therefore, key server 50 queries and receives the requested information from server 80.

When various servers communicate, the servers can authenticate communications if increased security is desired. Therefore, the servers can have a shared secret. A shared secret is hash code of the data that they send that is sent and proves that the sender possesses the shared secret. It should be noted that the shared secret itself is not sent. Sine the hash code is based upon the shared secret, communications that are not validated with the shared secret are ignored, thereby preventing spoofing.

It should be noted that the network connections have been shown as a one-to-one connection for illustrative purposes, the actual physical architecture can be much more complex. For example, local node 50 may have several routes in which to retrieve information from server 80, rather than the single path illustrated. Local node 50 could receive information along the path from server 80, throughout key server 74, to root key server 36. Local node 50 may also retrieve information directly from server 80 through a direct connection. Additionally, a root cluster rather than single root servers can serve as the root so that the root key servers of FIG. 4 would constitute a root cluster server. Regardless, this distributed architecture provides for a redundant, distributed database with improved efficiency for public key lookup.

In the event that a member is added to the network, and again using e-mail as an example but not limiting the application to e-mail, an account may be created on key server 50. This server may be the location for tovaris.com. The e-mail account may be Kconley@tovaris.com. When this email account is created, a public and private key is associated with the account "Kconley" under the second level domain "tovaris" of top-level domain "com." Therefore, server 50 stores the public key associated with Kconley@tovaris.com on its computer readable medium. It should be noted that the public key can also be stored on a local computer such as terminal 10 so that key server 50 would may only store the location of the public key rather than the key itself. Once created, the servers upstream are aware of the location of the public key through, at least, the root server so that a public key request from a sender would be told to query key server 50 for the public key for Kconley@tovaris.com. In one embodiment, the search for the public key of "Kconley" would contain the recipient's electronic address Kconley@tovaris.com. If key server 36 is the master for the .com domain, then the root server public keys associated with a .com address would be sent to the .com key server space 48. Key server 50 may be a member of the "tovaris.com" zone and therefore, any public keys associated with a tovaris.com address would be sent to the tovaris.com zone, or to key server 50. Such an indexing system allows for efficient and timely key look-up over a distributed network without actually having to store keys at a central location.

Figure 3:
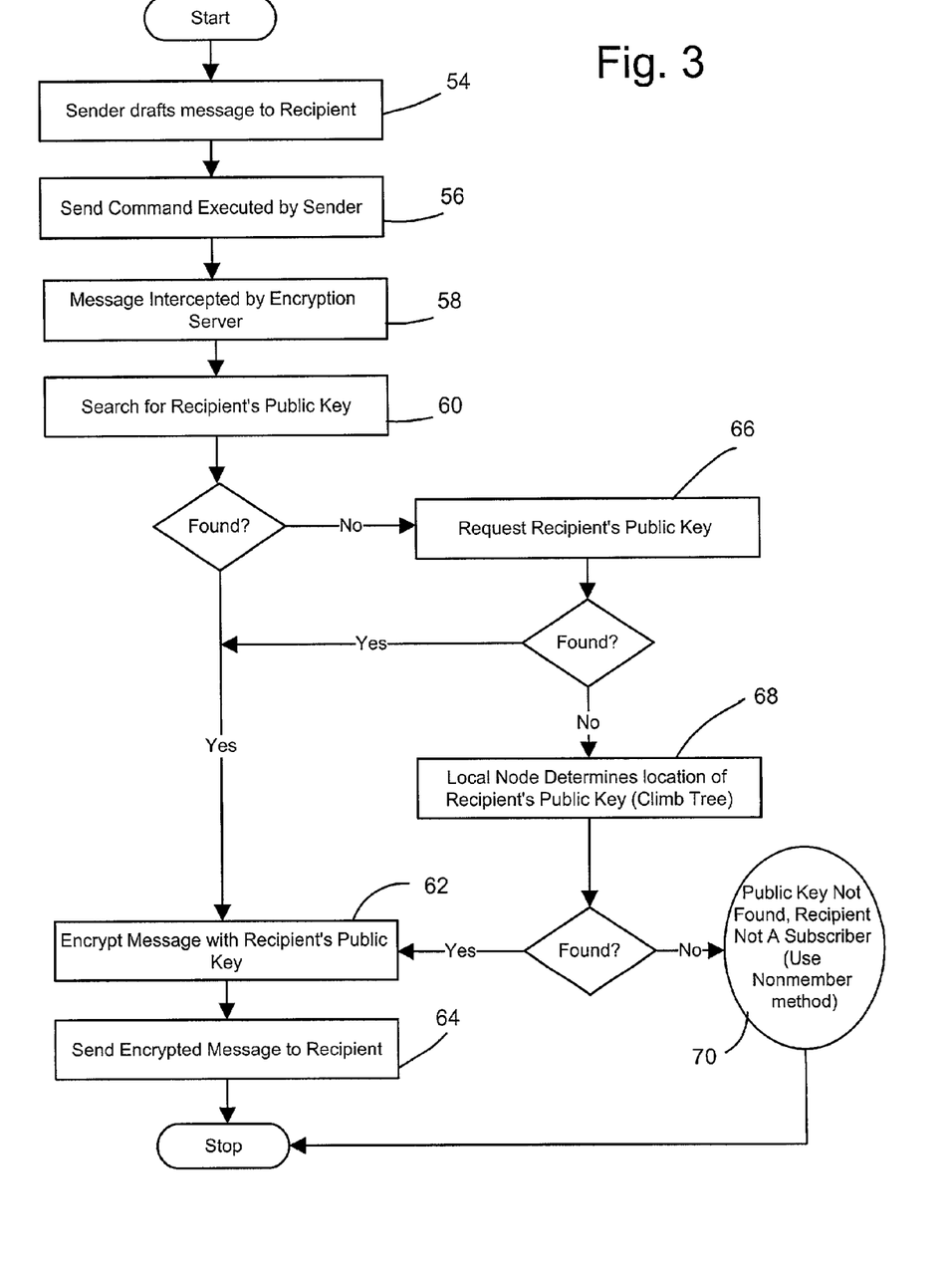
FIG. 3 is a flow chart illustrating the steps for sending an encrypted message.

While not limited to e-mail, the steps performed through the interaction of the computer hardware and software is further described in FIG. 3 as an e-mail example. A sender drafts a message in step 54. This sender than executes a send command for the message to be sent to a recipient in step 56. The encryption server can then intercept the message in step 58 and search for the public key information associated with the recipient locally in step 60. If the information is found, the message is encrypted in step 62 and sent to the recipient in encrypted form in step 64 for decryption by the recipient through the mail server. If the information is not found, the encryption server requests the recipient's public key information from the next highest node in step 66. If the information is found in that node, the encryption server retrieves the public key and steps 62 and 64 are executed. If the information is not found at the next node, the local node queries for the information upstream and awaits a response in step 68. If the information was discovered, the information is returned to the encryption server and steps 62 and 64 are executed. Otherwise, the recipient is not a member of the system or the public key is unavailable for some other reason. At this point, the sender can be prompted, in step 70, to provide an alternative encryption system, send the message without encryption or abort transmission of the message.

Referring now to FIG. 5, the steps performed by a key server will be illustrated. When a request for a recipient's public key is received in step 82, a local database is queried for the recipient's public key in step 84. If the key is found in step 86, then the public key is sent to the sender in step 88 and the message can be encrypted for sending. If the public key is not found and the local server is not a root server in step 90, a request for the recipient's public key is sent upstream in step 92. The request is sent to a root server who can return the public key, the pointer to a public key or send a not found statement. The request can also be sent to the location that is associated with a returned pointer so that the requesting server can retrieve the public key. If the request is timed out in step 94, then there may be a potential communications problem in step 96 and a message that the recipient's public key has not been found is sent to the sender in step 98. It should be noted that if the local server is the root server in step 90 and the public key has not been found in step 86, and the recipient's public key is not found in the system, then a message is sent to the sender informing him so in step 98. If the request is not timed out in step 94 and the local server does not receive the public key in step 100, then the recipient's public key is not found. If the recipient's public key is found in step 100, then the public key is sent to the sender so that the message can be encrypted This invention may, however, be embodied in many different forms and should not be construed as limited to the embodiments set forth herein; rather, these embodiments are provided so that this disclosure will be thorough and complete, and will fully convey the scope of the invention to those skilled in the art.

What is claimed is:

1. A computerized system for the decentralized storing and publishing of encryption keys for an electronic encryption system that sends encrypted transmissions between a sender's e-mail account and a recipient comprising:

a first computer readable medium having a first communications connection for electronic communications over a network;

a first storage area embodied within said first computer readable medium;

a second computer readable medium having a second communications connection for electronic communications over a network for providing electronic communications with said first computer readable medium;

a second database having a second set of public keys embodied in said second computer readable medium;

a first set of computer readable instructions embodied within said first computer readable medium for:

intercepting an electronic message generated from the sender's e-mail account that is to be encrypted, generating a first request for a recipient's public key according to said intercepted electronic message;

querying said first storage area for the recipient's public key;

encrypting said intercepted electronic message according to the recipient's public key if the recipient's public key is found within said first storage area, and, if the recipient's public key is not found in said first storage area, transmitting a second request for the recipient's public key to said second computer readable medium, retrieving the recipient's public key from said second computer readable medium, transmitting the recipient's public key to said first computer readable medium so that the first computer readable instructions can encrypt said intercepted electronic message with the recipient's public key located in the distributed storage system.

2. The system of claim 1 wherein:

said second communications connection allows for electronic communications with a root server; and, a second set of computer readable instructions embodied within said second computer readable medium for:

receiving a second request for the recipient's public key from said first set of computer readable instructions, querying said second database for the recipient's public key, transmitting the recipient's public key to said first computer readable medium if the recipient's public key is found in said second database, transmitting an upstream request to said root server for the recipient's public key is not found in said second database;

receiving the recipient's public key if the recipients' public key is provided by said root server;

receiving a pointer to the recipient's public key if the pointer to the public key is provided by said root server; and, retrieving the recipient's public key from a location provided by the root pointer to the recipient's public key if the pointer to the recipient's public key is provided to said first computer readable medium.

3. The system of claim 2 including:

a root computer readable medium having a root communications connection for communicating with the network and said second computer readable medium;

a root database embodied in said root computer readable medium containing pointers to all public keys of the encryption system;

a set of computer readable root instructions embodied in said root computer readable medium for:

receiving said upstream request from said second set of computer readable instructions, querying said root database for the pointer to the recipient's public key, transmitting the pointer of the recipient's public key to said second computer readable medium if the pointer to the recipient's public key is found within said root database, and, transmitting a not found statement to said second computer readable medium if the pointer to the recipient's public key is not found in said root database so that the sender can be provided with the recipient's public key or the sender can be informed that the recipient's public key can not be found.

4. The system of claim 3 including:

said set of computer readable root instructions includes instruction for transmitting said key server address of the next key computer readable medium down the hierarchy having a pointer to the recipient's public key.

5. The system of claim 3 including:

a plurality of key computer readable mediums arranged in a hierarchy having public keys stored within said computer readable mediums;

a plurality of key server address associated with each of said key computer readable mediums representing the location of said key computer readable mediums within said hierarchy; and, said set of computer readable root instructions includes instruction for transmitting said key server address of the next key computer readable medium down the hierarchy having the recipient's public key.

6. The system of claim 2 including:

a root server cluster having a root computer readable medium and a root communications connection for communicating with the network and said second computer readable medium;

a root database embodied within said root server cluster containing pointers to all of the public keys of the encryption system;

a set of computer readable medium root instructions embodied in said root server cluster for:

receiving said upstream request from said second set of computer readable instructions, querying said root database for the requested recipient's public key, transmitting the recipient's public key to said second computer readable medium if the recipient's public key is found within said root database, and, transmitting a not found statement to said second computer readable medium if the recipient's public key is not found in said root database so that the sender can be provided with the recipient's public key or the sender can be informed that the recipient's public key can not be found.

7. The system of claim 1 wherein said first set of computer readable instructions includes instruction for:

receiving the recipient's public key from said second computer readable medium if the recipient's public key is found within said second database; and, transmitting the recipient's public key to the sender if the recipient's public key is received from said second computer readable medium so that the sender may encrypt a transmission with the recipient's public key.

8. The system of claim 7 wherein said first set of computer readable instructions includes instruction for storing the recipient's public key within said first computer readable medium upon receipt of the recipient's public key so that the recipient's public key is available upon subsequent requests received for the recipient's public key.

9. The system of claim 1 including:

a temporary storage section contained within said first computer readable medium; and, said first set of computer readable instructions include instruction for: receiving the recipient's public key from said second computer readable medium if said second computer readable medium provides the recipient public key; and, storing the recipient's public key within said temporary storage section upon receipt of the recipient's public key from said second computer readable medium so that the recipient's public key is available from said temporary storage section according to the subsequent request for the recipient's public key.

10. The system of claim 9 wherein said first set of computer readable instructions include instruction for deleting the received recipient's public key from said temporary storage section upon the expiration of a predetermined period of time.

11. The system of claim 9 wherein said first set of computer readable instructions include instruction for deleting the received recipient's public key from said temporary storage section according to a set of predetermined criteria.

12. A computerized system for the decentralized storing and publishing of encryption keys for an electronic encryption system for sending encrypted transmissions between a sender's e-mail account and a recipient comprising:

a first computer readable medium;

a communications connection in communication with said first computer readable medium for transmitting and receiving electronic information on a network;

a database embodied in said first computer readable medium having public keys;

a set of computer readable instructions embodied in said first computer readable medium for:

intercepting an electronic message generated from the sender's e-mail account that is to be encrypted, generating a request for the recipient's public key according to said intercepted electronic message, querying said database for said recipient's public key, retrieving said public key if the recipient's public key is found in said database and encrypting said intercepted electronic message according to said recipient's public key; and, if said public key is not found in said database, transmitting an upstream request to an upstream server for the recipient's public key, retrieving the recipient's public key from said upstream server, transmitting the recipient's public key to said first computer readable medium so that said first set of computer readable instructions can encrypt said intercepted electronic message according to the recipient's public key retrieved from the decentralized storage system.

13. The system of claim 12 including:

a root computer readable medium having a root communications connection for communicating with the network and said first computer readable medium;

a root database containing pointers to all public keys of the encryption system;

a set of computer readable root instructions embodied in said root computer readable medium for:

receiving an upstream request for the recipient's public key to said computer readable medium, transmitting the pointer to the recipient's public key from said first computer readable medium if the pointer to the recipient's public key is found within said root database, and, transmitting a not found statement to said computer readable medium if the pointer to the recipient's public key is not found in said root database.

14. The system of claim 12 including:
a root computer readable medium having a root communications connection for communicating with the network and said first computer readable medium;
a plurality of key computer readable mediums arranged in a hierarchy having public keys stored within said key computer readable mediums in communication with said root computer readable medium and said first computer readable mediums;
a plurality of key server addresses associated with each of said computer readable mediums representing the location of said key computer readable mediums within said hierarchy; and,
a set of computer readable root instructions embodied in said root computer readable medium for:
receiving an upstream request for the recipient's public key,
querying said root computer readable for the recipient's public key; and,
transmitting the key server address of the next key computer readable medium down the hierarchy if the recipient's public key was not found within said root computer readable medium.

15. The system of claim 14 including:
a root computer readable medium having a root communications connection with said network, first computer readable medium and second computer readable medium;
a root database containing address pointers to all public keys of the encryption system;
a set of computer readable root instructions embodied in said root computer readable medium for:
receiving the request for the address pointer of the recipient's public key from said first set of computer readable instructions,
querying said root database for the pointer to the recipient's public key,
transmitting the pointer to the recipient's public key to said first computer readable medium if the address pointer to the recipient's public key is found within said root database so that the sender can be provided the public key of the recipient to send an encrypted message, and,
transmitting a not found statement to said first set of computer readable instructions so that the sender can be informed that the recipient's public key can not be found.

16. The system of claim 14 wherein said computer readable instructions include instruction for transmitting a final request to a location according to receiving the pointer of the recipient's public key so that said computer readable instructions can discover the recipient's public key at the pointer location.

17. The system of claim 16 having a root server cluster embodying said root computer readable medium.

18. The system of claim 12 including: a temporary storage section contained with said computer readable medium; and, said set of computer readable instructions include instruction for:

receiving the recipient's public key from said upstream server, and,
storing the recipient's public key within said temporary storage section upon receipt of the recipient's public key from said upstream server so that the recipient's public key is available to said computer readable medium.

19. A computerized system for the decentralized storing and publishing of encryption keys for an electronic encryption system that sends encrypted transmissions between a sender and a recipient comprising:
a first computer readable medium having a first communications connection for electronic communications over a network;
a second computer readable medium having a second communications connection for electronic communications over a network for providing electronic communications with said first computer readable medium;
a database having a set of public keys and public key address pointers embodied in said second computer readable medium;
a first set of computer readable instructions embodied within said first computer readable medium for:
intercepting an electronic message generated from the sender's e-mail account that is to be encrypted,
generating a request for a recipient's public key according to said intercepted electronic message,
querying said first computer readable medium for the requested recipient's public key;
querying said first computer readable medium for the address pointer if the recipient's public key if the recipient's public key was not found,
generating a second request for the requested recipient's public key if said address pointer of the recipient's public key or the recipient's public key was not found,
transmitting said second request to said second database,
receiving the recipient's public key if the recipient's public key is found on said database,
receiving the pointer to the recipient's public key if the pointer of the recipient's public key is found on said database,
receiving the recipient's public key according to the address pointer if the recipient's public key is received, and,
transmitting the recipient's public key to said first computer readable medium if the recipient's public key is received, so that said first set of computer readable instructions can encrypt the intercepted electronic message according to the received recipient's public key.

20. The system of claim 19 where said first set of computer readable instructions include instruction for storing the address pointer of the recipient's public key within said first computer readable medium so that said first set of computer readable instructions can retrieve the recipient's public key according to subsequent requests for the recipient's public key.

21. The system of claim 15 wherein said received address pointer of the recipient's public key is removed from said first computer readable medium according to predetermined criteria.

* * * * *